United States Patent
Yamanaka

(10) Patent No.: US 11,935,314 B2
(45) Date of Patent: Mar. 19, 2024

(54) APPARATUS FOR GENERATING A BINARY IMAGE INTO A WHITE PIXEL, STORAGE MEDIUM, AND METHOD

(71) Applicant: CANON KABUSHIKI KAISHA, Tokyo (JP)

(72) Inventor: Satoru Yamanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 17/125,753

(22) Filed: Dec. 17, 2020

(65) Prior Publication Data

US 2021/0192262 A1    Jun. 24, 2021

(30) Foreign Application Priority Data

Dec. 23, 2019   (JP) ................................ 2019-232162

(51) Int. Cl.
*G06V 10/00* (2022.01)
*G06V 30/14* (2022.01)
(Continued)

(52) U.S. Cl.
CPC .......... *G06V 30/40* (2022.01); *G06V 30/1444* (2022.01); *G06V 30/155* (2022.01); *G06V 30/18105* (2022.01); *G06V 30/10* (2022.01)

(58) Field of Classification Search
CPC ...... G06V 10/273; G06V 10/20; G06V 10/22; G06V 10/28; G06V 10/457; G06V 10/56; G06V 30/10; G06V 30/1444; G06V 30/155; G06V 30/18105; G06V 30/40; H04N 1/40012; H04N 1/405; H04N 2201/0081

See application file for complete search history.

(56) References Cited

U.S. PATENT DOCUMENTS

2016/0212302 A1* 7/2016 Frieder ............... G06V 10/141
2016/0330438 A1* 11/2016 Pinkus ................ H04N 17/002
(Continued)

FOREIGN PATENT DOCUMENTS

JP    2003325409        *   4/2005
JP    2005092543 A          4/2005
(Continued)

OTHER PUBLICATIONS

Drawings for 2003325409, uploaded separately, Sep. 18, 2003.*
(Continued)

*Primary Examiner* — Molly Wilburn
*Assistant Examiner* — Ahmed A Nasher
(74) *Attorney, Agent, or Firm* — Canon U.S.A., Inc. I.P. Division

(57) ABSTRACT

In the present disclosure, a candidate area is determined based on a pixel having a specific color included in an input image, and an area is determined to be a processing target from the candidate area based on a pixel having a predetermined color different from the specific color included in the candidate area. Further, a second binary image in which a pixel corresponding to the pixel having the specific color is converted into a white pixel is generated by converting, in a first binary image obtained by the input image being binarized, a pixel that is included in the area determined to be the processing target and corresponds to the pixel having the specific color, into a white pixel.

22 Claims, 12 Drawing Sheets

(51) Int. Cl.
*G06V 30/148* (2022.01)
*G06V 30/18* (2022.01)
*G06V 30/40* (2022.01)
*G06V 30/10* (2022.01)

(56) References Cited

U.S. PATENT DOCUMENTS

2021/0127032 A1* 4/2021 Honda .................. G06V 30/412
2021/0192695 A1* 6/2021 Kosaka .................. G06T 7/187

FOREIGN PATENT DOCUMENTS

JP     2005165661 A    6/2005
JP       4300083 B2 *   7/2009

OTHER PUBLICATIONS

Soumyadeep Dey et al., "Removal of Gray Rubber Stamps", 2016 12th IAPR Workshop on Document Analysis Systems (DAS), IEEE, Apr. 11, 2016, pp. 210-214.

* cited by examiner

FIG.3

```
                                    INVOICE                  ~300

Bill No: 100100
                                 Date: 2019/8/20    ~302
         Bill to : XXXX Inc.     User ID: ABC12345
                                 Validated Date: 2019/9/20

AAAA Inc.
                                       VOID          ~301
                                    TEL: 00-1234-5678
```

| ItemName   | Quantity | UnitPrice | SubTotal   |
|------------|----------|-----------|------------|
| Material A | 20       | ¥250.00   | ¥5,000.00  |
| Parts B    | 50       | ¥50.00    | ¥2,500.00  |
|            |          |           | ¥0.00      |
|            |          |           | ¥0.00      |
|            |          |           | ¥0.00      |
|            |          |           | ¥0.00      |
|            |          |           | ¥0.00      |
|            |          |           | ¥0.00      |

| SubTotal | ¥ 7,500.00 |
|----------|------------|
| Tax      | ¥ 600.00   |
| Total    | ¥ 8,100.00 |

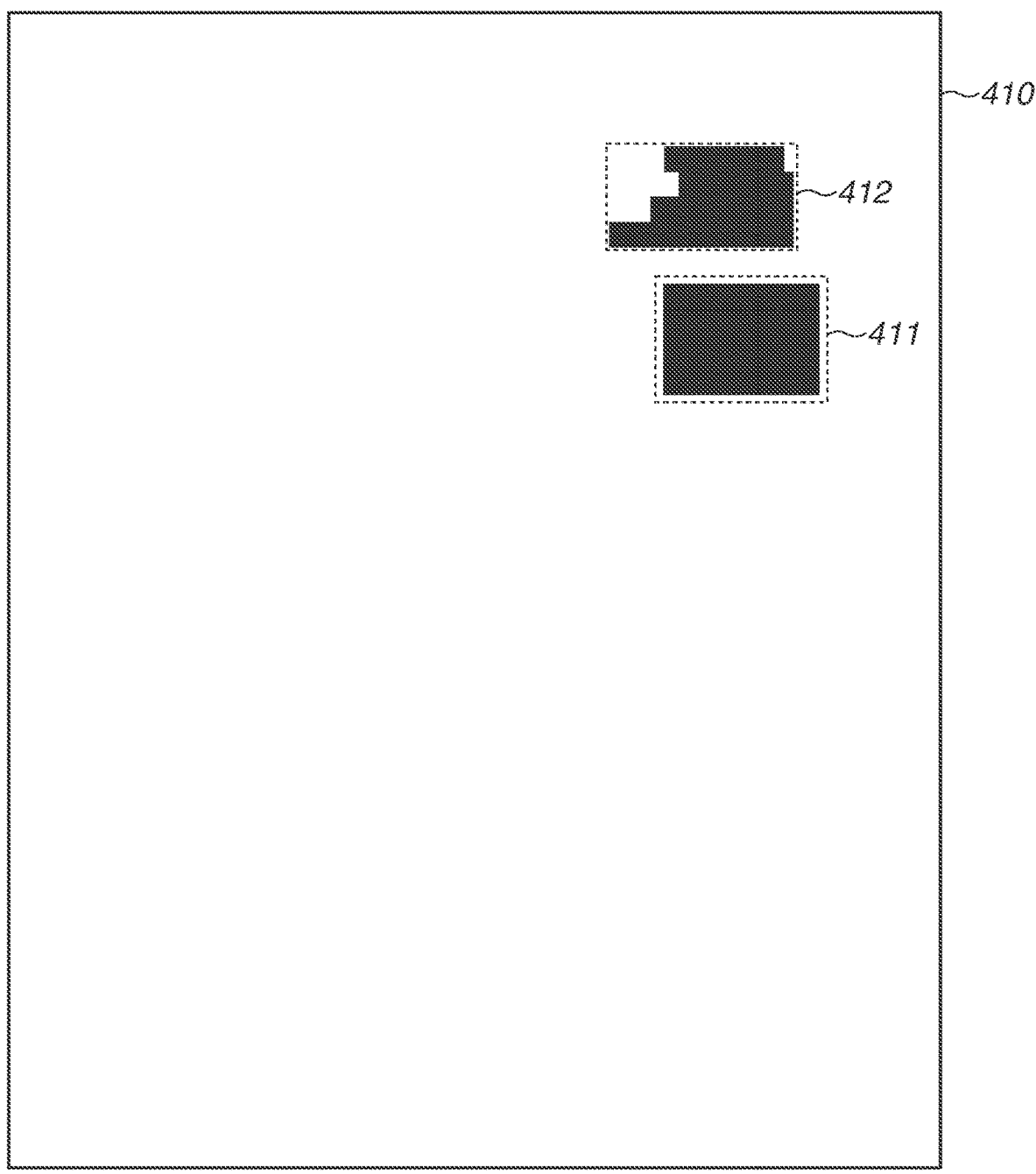

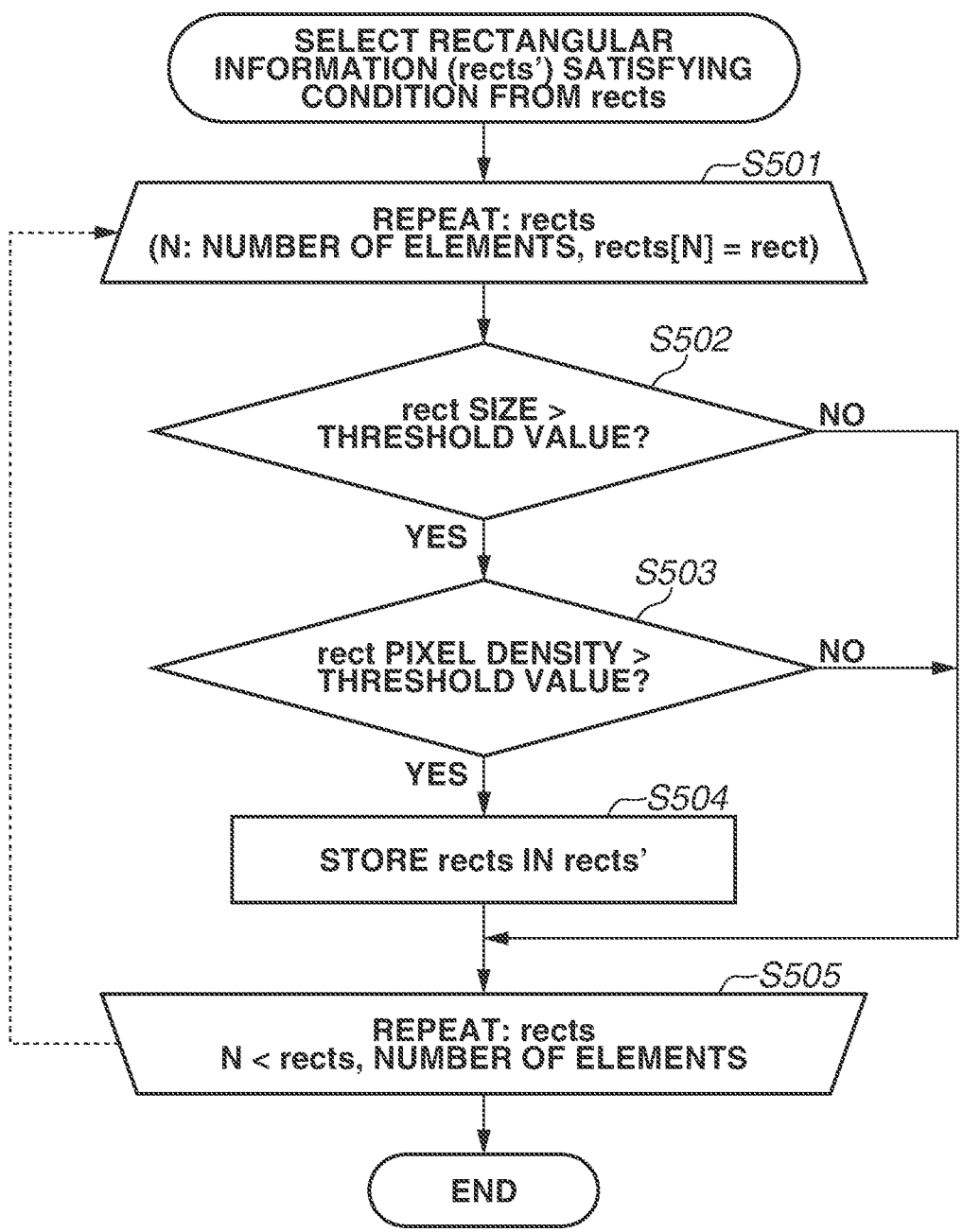

FIG.6

| ItemName | Quantity | UnitPrice | SubTotal |
|---|---|---|---|
| Material A | 20 | ¥250.00 | ¥5,000.00 |
| Parts B | 50 | ¥50.00 | ¥2,500.00 |
|  |  |  | ¥0.00 |
|  |  |  | ¥0.00 |
|  |  |  | ¥0.00 |
|  |  |  | ¥0.00 |
|  |  |  | ¥0.00 |
|  |  |  | ¥0.00 |

| SubTotal | ¥ 7,500.00 |
|---|---|
| Tax | ¥ 600.00 |
| Total | ¥ 8,100.00 |

Bill to : XXXX Inc.

INVOICE

Bill No: 100100
Date: 2019/8/20
User ID: ABC12345
Validated Date: 2019/9/20

AAAA Inc.
VOID
TEL: 00-1234-5678

FIG.8

| ItemName | Quantity | UnitPrice | SubTotal |
|---|---|---|---|
| Material A | 20 | ¥250.00 | ¥5,000.00 |
| Parts B | 50 | ¥50.00 | ¥2,500.00 |
|  |  |  | ¥0.00 |
|  |  |  | ¥0.00 |
|  |  |  | ¥0.00 |
|  |  |  | ¥0.00 |
|  |  |  | ¥0.00 |
|  |  |  | ¥0.00 |

| SubTotal | ¥ 7,500.00 |
|---|---|
| Tax | ¥ 600.00 |
| Total | ¥ 8,100.00 |

INVOICE

Bill to : XXXX Inc.

AAAA Inc.
123-0045
0-0, BB City, CCC Pref.
TEL: 00-1234-5678

FIG.9

| ItemName | Quantity | UnitPrice | SubTotal |
|---|---|---|---|
| Material A | 20 | ¥250.00 | ¥5,000.00 |
| Parts B | 50 | ¥50.00 | ¥2,500.00 |
|  |  |  | ¥0.00 |
|  |  |  | ¥0.00 |
|  |  |  | ¥0.00 |
|  |  |  | ¥0.00 |
|  |  |  | ¥0.00 |
|  |  |  | ¥0.00 |

| SubTotal | ¥ 7,500.00 |
|---|---|
| Tax | ¥ 600.00 |
| Total | ¥ 8,100.00 |

INVOICE ~900

Bill No: 100100
Date: 2019/8/20
User ID: ABC12345
Validated Date: 2019/9/20 ~902

Bill to : XXXX Inc.

AAAA Inc.
123-0045
0-0, BB City, CCC Pref.
TEL: 00-1234-5678 ~901

APPARATUS FOR GENERATING A BINARY IMAGE INTO A WHITE PIXEL, STORAGE MEDIUM, AND METHOD

BACKGROUND OF THE DISCLOSURE

Field of the Disclosure

The aspect of the embodiments relates to a technique for generating a binary image in a state in which a pixel having a specific color is removed from an input image.

Description of the Related Art

A system has been being developed in which character information is extracted from a form image read by a scanner and character recognition (hereinbelow, referred to as OCR) is performed on the extracted character information to improve efficiency in accounting services. The character information to be extracted from a form includes a date, a total amount, and a company's name and is obtained by estimating an item value based on an item name, a unit, and a format of each piece of information. However, the character information cannot be extracted in some cases because a character as an extraction target overlaps an image other than the character, for example, in a case where a form image includes an impression of, for example, a seal or a stamp (hereinafter, the impression is simply referred to as a seal) overlapping a character.

According to Japanese Patent Application Laid-Open No. 2005-92543, a following method is used for recognizing a character overlapping a seal. Specifically, a red pixel having a color in the same color group as that of the color of a seal is extracted to extract a block of the red pixels as a connection component. A circumscribed rectangle of the connection component is obtained, a size of the circumscribed rectangle or a density of the red pixel in the circumscribed rectangle is detected, and the circumscribed rectangle is extracted as a seal area based on the size or the density. Further, pixels corresponding to the seal are removed by converting the red pixels in the seal area into white pixels (hereinbelow, sometimes referred to as conversion into white pixels) to facilitate the recognizing of a character in a portion upon which the seal is affixed.

However, the method discussed in Japanese Patent Application Laid-Open No. 2005-92543 has the following issues. In a case where a character string in the same color group as that for a seal (red) exists in a form over a plurality of lines, and a size and a pixel density of an area including the character string in the plurality of lines are close to those of the seal, the character string area may be erroneously detected as the seal and removed (converted into white pixels). Further, in a case where a form includes a character having a size, a density, and a color close to the seal or a red character surrounded by a red (same color group as that for the seal) border, such a character may be similarly removed.

SUMMARY OF THE DISCLOSURE

An apparatus comprises at least one memory that stores a set of instructions; and at least one processor that executes the instructions to perform: determining a candidate area based on a pixel having a specific color included in an input image; determining an area to be a processing target from the candidate area based on a pixel having a predetermined color different from the specific color included in the candidate area; and generating, by converting, in a first binary image obtained by the input image being binarized, a pixel that is included in the area determined to be the processing target and corresponds to the pixel having the specific color, into a white pixel, a second binary image in which a pixel corresponding to the pixel having the specific color is converted into a white pixel.

Further features of the disclosure will become apparent from the following description of exemplary embodiments with reference to the attached drawings.

BRIEF DESCRIPTION OF THE DRAWINGS

FIG. 3 illustrates an example of an input image.

FIG. 4B illustrates an example of an area determination image obtained as a result of morphology processing executed on a red color extraction image.

FIG. 5 is a flowchart illustrating processing of selecting rectangular information that satisfies a condition for a seal likeliness.

FIG. 6 illustrates an example of a binary image obtained by performing binarization processing on an input image.

FIG. 8 illustrates an example of a red pixel removal image.

FIG. 9 illustrates an example of a seal-removed binary image obtained by removing red pixels (converting red pixels into white pixels) in an area which is determined to be an area including a seal overlapping a character.

DESCRIPTION OF THE EMBODIMENTS

First Exemplary Embodiment

Figure 1:
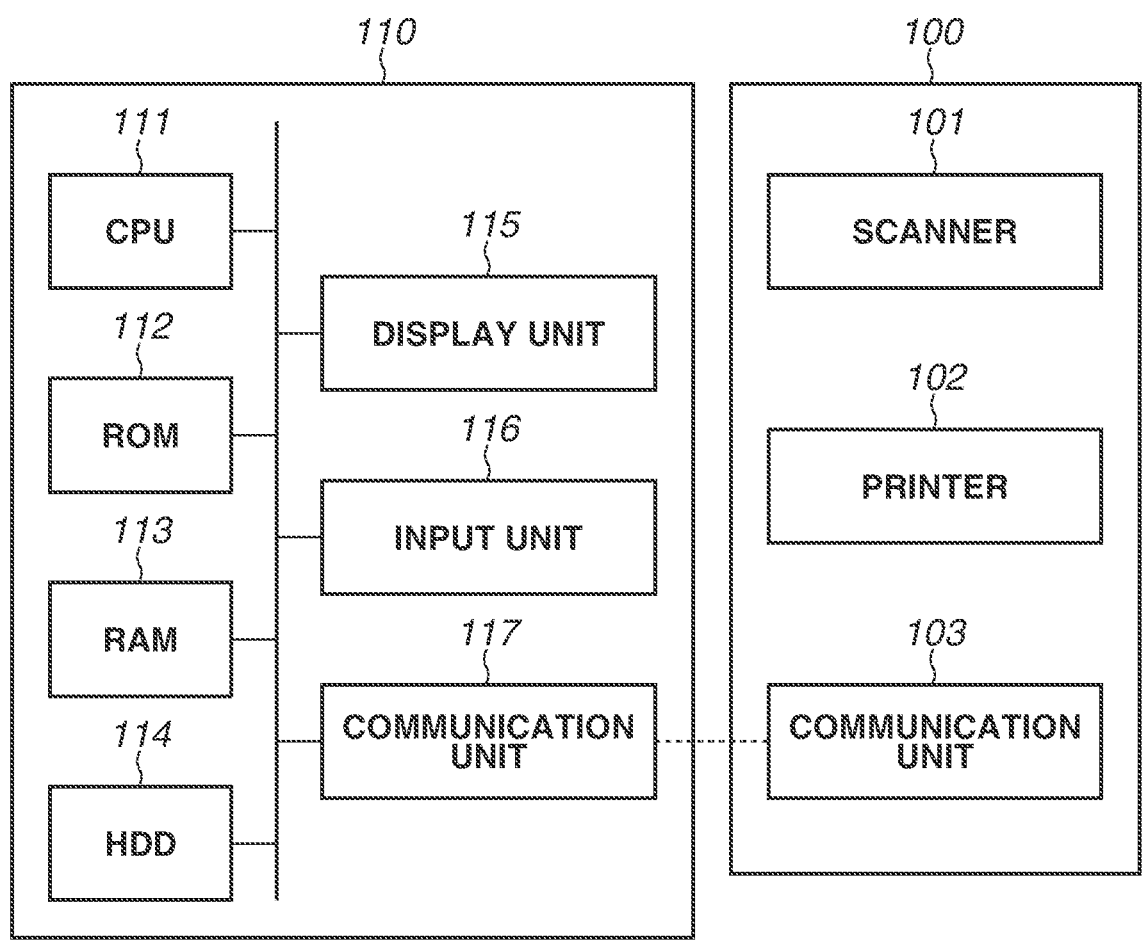
FIG. 1 illustrates an information processing system according to a first exemplary embodiment.

FIG. 1 illustrates an information processing system according to a first exemplary embodiment. The information processing system includes a multifunction peripheral (MFP) 100 and an information processing apparatus 110. The MFP 100 includes a scanner 101 capable of reading a color document, a printer 102, and a communication unit 103. The scanner 101 scans a document and generates a scanned image. The printer 102 forms an image. The communication unit 103 communicates with an external apparatus via a network.

The information processing apparatus 110 includes a central processing unit (CPU) 111, a read-only memory (ROM) 112, a random access memory (RAM) 113, a hard disk drive (HDD) 114, a display unit 115, an input unit 116, and a communication unit 117. The CPU 111 reads a control program stored in the ROM 112 and executes various types of processing. The RAM 113 is used as a temporary storage area, such as a main memory and a work area of the CPU 111. The HDD 114 stores various data, programs, and the like. The functions and processing of the information processing apparatus 110 described below are realized by the CPU 111 reading a program stored in the ROM 112 or the HDD 114 and executing the program. In other words, the program is a computer-executable program for causing a computer to function as each processing unit which executes the functions and the processing described below.

The communication unit 117 performs communication processing with an external apparatus via the network. The display unit 115 displays various types of information. The input unit 116 includes a keyboard and a mouse and receives various operations performed by a user. The display unit 115 and the input unit 116 may be integrally provided, as in a touch panel. Further, the display unit 115 may be a projection display configured to project an image, and the input unit 116 may recognize a position of a fingertip with respect to the projected image by using a camera.

According to the present exemplary embodiment, the scanner 101 of the MFP 100 scans a document, such as a report, and generates an input image. The input image is transmitted to the information processing apparatus 110 via the communication unit 103. The information processing apparatus 110 receives the input image via the communication unit 117 and stores the input image in a storage unit, such as the HDD 114. The present exemplary embodiment will be described on the assumption that the color of a seal impression (hereinafter, simply referred to as a seal) is red, and an image including a red seal is received as an input image.

Figure 2:
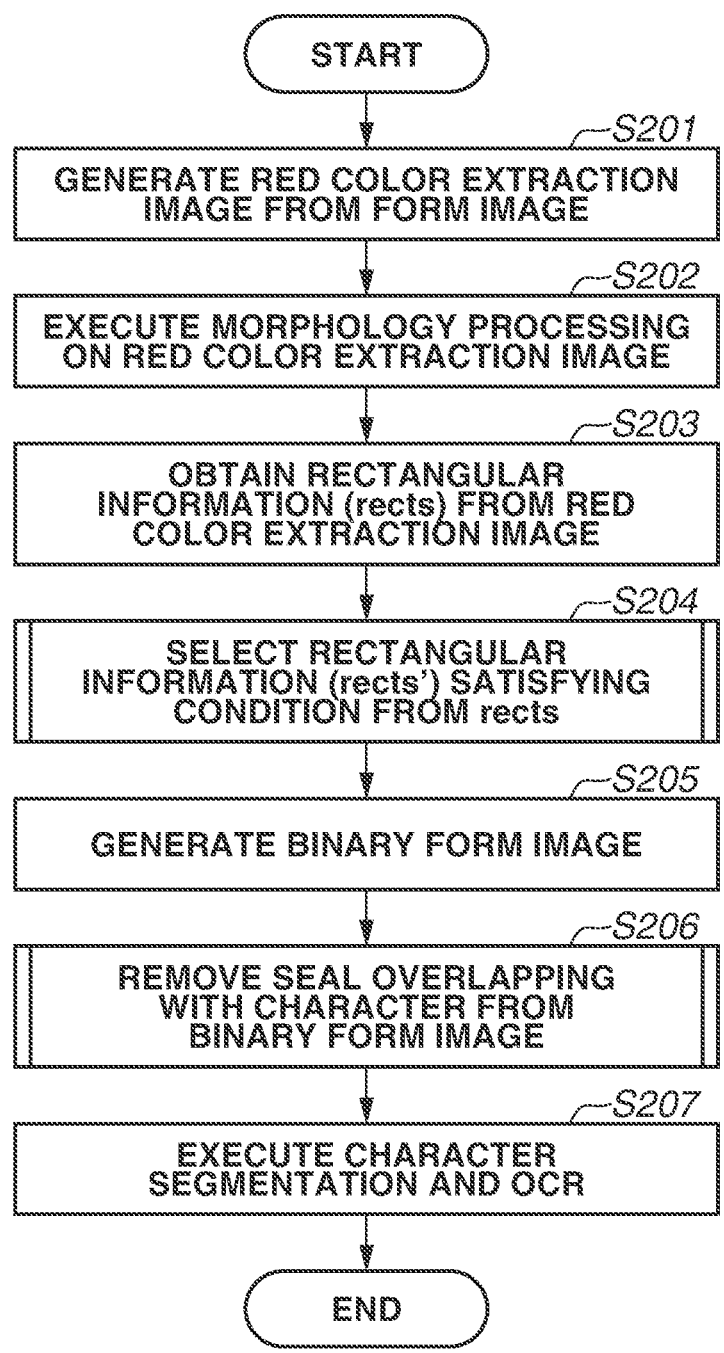
FIG. 2 is a flowchart illustrating image processing according to the first exemplary embodiment.
Figure 4A:
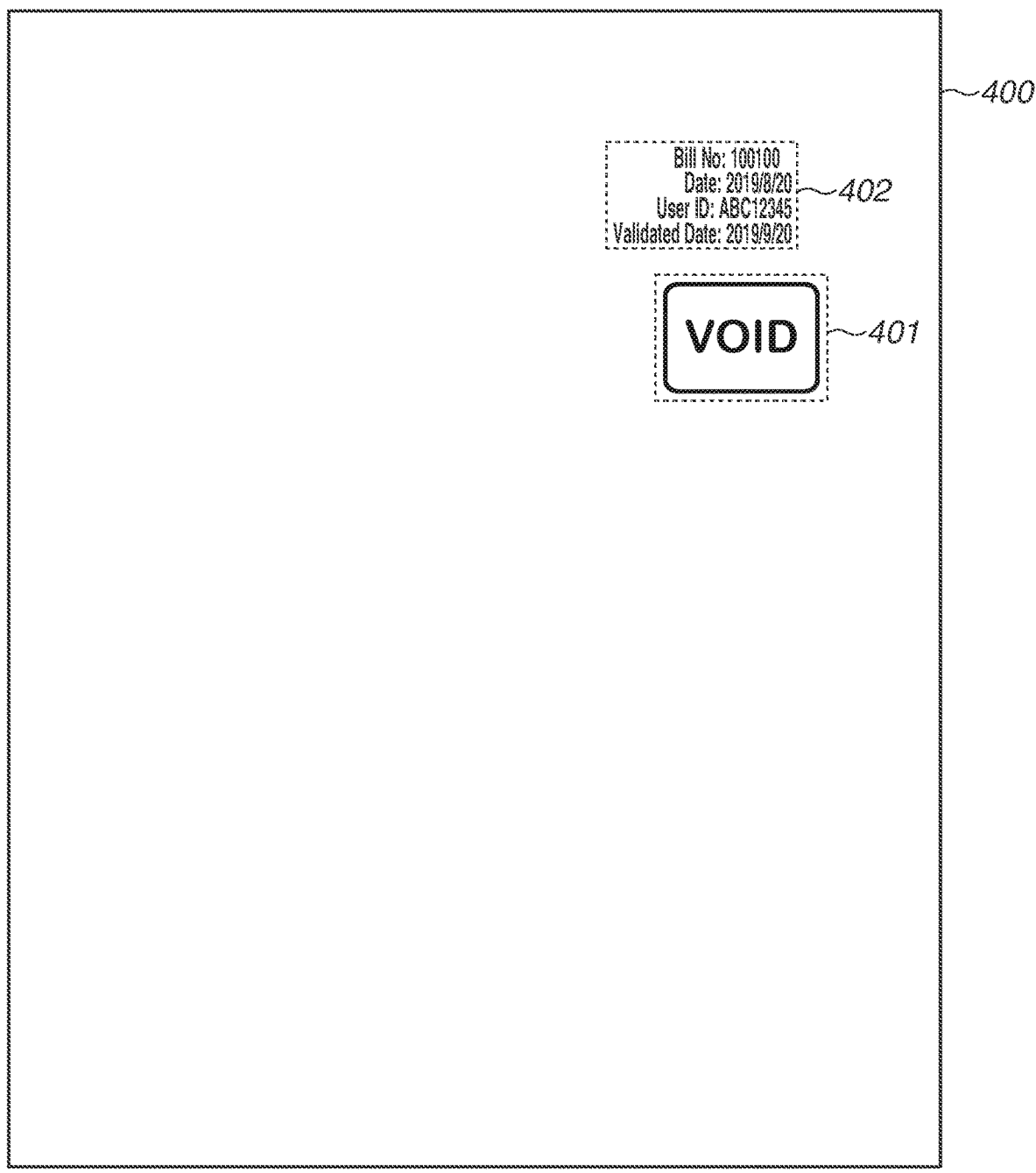
FIG. 4A illustrates an example of a red color extraction image which is generated based on a red pixel in an input image.

FIG. 2 is a flowchart illustrating image processing which is performed on a character overlapping a seal according to the present exemplary embodiment. In step S201, the CPU 111 analyzes color information of the input image (a form image) and generates a binary image in which a red pixel is expressed as a black pixel, and the other pixels are expressed as white pixels. FIG. 3 illustrates a form image 300 as an example of an input image. A character area 301 in the form image 300 includes black characters overlapping a red seal, and a red character area 302 includes red characters. FIG. 4A illustrates a red color extraction image 400 which is generated based on the red pixels that are determined to be red pixels from the form image 300 in FIG. 3. The red color extraction image 400 is a binary image in which the red pixels as an extraction target are expressed as black pixels, and the other pixels are expressed as white pixels. In the red color extraction image 400 in FIG. 4A, a red seal image overlapping the character area 301 appears in an area 401, and an image of red characters existing in the red character area 302 appears in an area 402. Herein, the seal image is an image generated by, for example, a user putting a stamp, a seal, or the like. In the example in FIG. 4A, a character string "VOID" is indicated as the seal image in the area 401. The seal image is not limited to this example and may be a character string of other language and a figure. It is assumed that at least a part of the red seal image overlaps a black character string in the document.

Next, in step S202, the CPU 111 executes morphology processing on the red color extraction image 400, and performs processing of connecting black pixels existing near one another in the red color extraction image 400, thus generating an area determination image 410. The CPU 111 then stores the area determination image 410 in the RAM 113. According to the present exemplary embodiment, the area determination image 410 is generated by performing dilation processing and erosion processing on the black pixels in the red color extraction image 400 for once to a plurality of times. For example, the dilation processing in which a black pixel is dilated on its periphery by one pixel each for a plurality of times so that the black pixels in a character are connected to one another. The erosion processing is then performed for a plurality of times after the black pixels in the character are connected. In this way, an area determination image is obtained in which neighboring black pixels are connected with one another. The morphology processing is performed on the red color extraction image 400 in FIG. 4A, so that the area determination image 410 in which the neighboring black pixels are connected with each other can be obtained as illustrated in FIG. 4B. For example, the black pixels included in the area 401 in FIG. 4A are connected with each other and becomes one black pixel block in an area 411 in FIG. 4B. Further, the black pixels included in the area 402 in FIG. 4A are connected with each other and becomes one black pixel block in an area 412 in FIG. 4B. A line space of the characters in the area 402 is narrow, so that character lines are also connected with each other and form one black pixel block as in the area 412.

Next, in step S203, the CPU 111 obtains rectangular information about a rectangular circumscribing each black pixel block from the area determination image 410 and stores the rectangular information in the RAM 113 (rects). The rectangular information herein indicates information including a position and a size. More specifically, if a most upper left point, a right direction, and a downward direction of the area determination image 410 are respectively defined as an origin, an X-axis positive direction, and a Y-axis positive direction, each rectangular information is expressed by an upper left coordinate position of each black pixel block (a leftmost x-coordinate and an uppermost y-coordinate of the black pixel block) and a size (a width and a height) of each rectangle.

Next in step S204, the CPU 111 evaluates a seal likeliness of the rectangular information stored in the RAM 113 in step S203, and stores the rectangular information determined as a seal candidate in a different area in the RAM 113 (rects'). FIG. 5 is a flowchart illustrating processing for selecting the rectangular information that satisfies a condition for the seal likeliness in details. The CPU 111 performs the operations in steps S501 to S505 on each rectangular information.

Step S501 is a loop limit indicating a start of loop processing, and step S505 is a loop limit indicating the end of the loop processing. The loop processing is repeatedly executed until the operations in steps S502 to S504 are performed on all pieces of the rectangular information.

In step S502, the CPU 111 regards one of the pieces of the rectangular information obtained in step S203 as a processing target and evaluates whether a size (a width and a height) of the rectangular information as the processing target satisfies a predetermined condition (a condition for the seal candidate). In the present exemplary embodiment, a threshold value of the width and the height is 30 pixels, and the condition is satisfied in a case where the size of the rectangular information is more than the threshold value. In other words, in a case where the rectangular information is more than the threshold value (YES in step S502), the processing proceeds to step S503. In a case where the rectangular information is the threshold value or less (NO in step S502), the processing proceeds to step S505. Another threshold value may be used as long as the seal likeliness can be evaluated. For example, not only a lower limit threshold value but also an upper limit threshold value may be set. In such a case, determination is based on whether the size of the rectangular information falls within a range from the lower limit threshold value to the upper limit threshold value.

Next, in step S503, the CPU 111 calculates a pixel density in an area indicated by the rectangular information as the processing target and evaluates whether the pixel density is more than a threshold value. The pixel density according to the present exemplary embodiment is obtained by counting the number of black pixels in the area indicated by each rectangular information in the red color extraction image 400 and calculating a ratio of the counted number of black pixels to the size of the rectangular area. In the present exemplary embodiment, the threshold value is 0.18. In a case where the pixel density is more than the threshold value (YES in step S503), the processing proceeds to step S504. In a case where the pixel density is the threshold value or less (NO in step S503), the processing proceeds to step S505. According to the present exemplary embodiment, the threshold value has been described as 0.18, but is not limited to this value.

Next, in step S504, the CPU 111 determines that the rectangular information that satisfies the conditions in steps S502 and S503 is a seal candidate and stores the rectangular information in the different area (rects') in the RAM 113. The operation in step S504 is directed to, not storing the rectangular information in the different area, but to discriminating the rectangular information that satisfies the conditions for the seal candidate from the other pieces of the rectangular information. Thus, for example, the rectangular information may be discriminated by labeling.

In step S505, the CPU 111 determines whether a condition for terminating the loop processing is satisfied (whether all pieces of the rectangular information are evaluated), and in a case where there is the rectangular information not yet evaluated, the operations in steps S502 to S504 are repeated with the next rectangular information set to the processing target. In a case where the evaluation is completed for all pieces of the rectangular information, the processing in FIG. 5 (i.e., the operation in step S204) is terminated, and the processing proceeds to step S205 in FIG. 2. According to the present exemplary embodiment, the evaluation is made using the size and the pixel density of each piece of rectangular information as illustrated in FIG. 5. Alternatively, another evaluation index may be used as long as the seal likeliness can be evaluated. For example, the evaluation may be made in combination with an aspect ratio of the rectangle, contour information about the black pixel in the red color extraction image 400, a value indicating a certainty of an optical character recognition (OCR) result, and the like.

Next, in step S205, the CPU 111 stores a binary image which is obtained by binarizing the form image 300 in the RAM 113. Binarization processing herein is the converting of an image into two gradations of white and black. A pixel having a color darker than a threshold value is converted into a black pixel, and a pixel having a color lighter than the threshold value is converted into a white pixel. In other words, black pixels included in a black character and red pixels included in a red character and a seal are converted into black pixels in a binary image after binarization. FIG. 6 illustrates a binary form image 600 which is a result of binarization performed on the form image 300 in FIG. 3. According to the present exemplary embodiment, a method is used in which a luminance histogram of the entire form image 300 is calculated and a binary image is generated by determining a threshold value based on a peak corresponding to a white pixel in the background. Alternatively, another method may be used through which conversion into a black-and-white binary image is realized with an accuracy that enables subsequent OCR.

Figure 7:
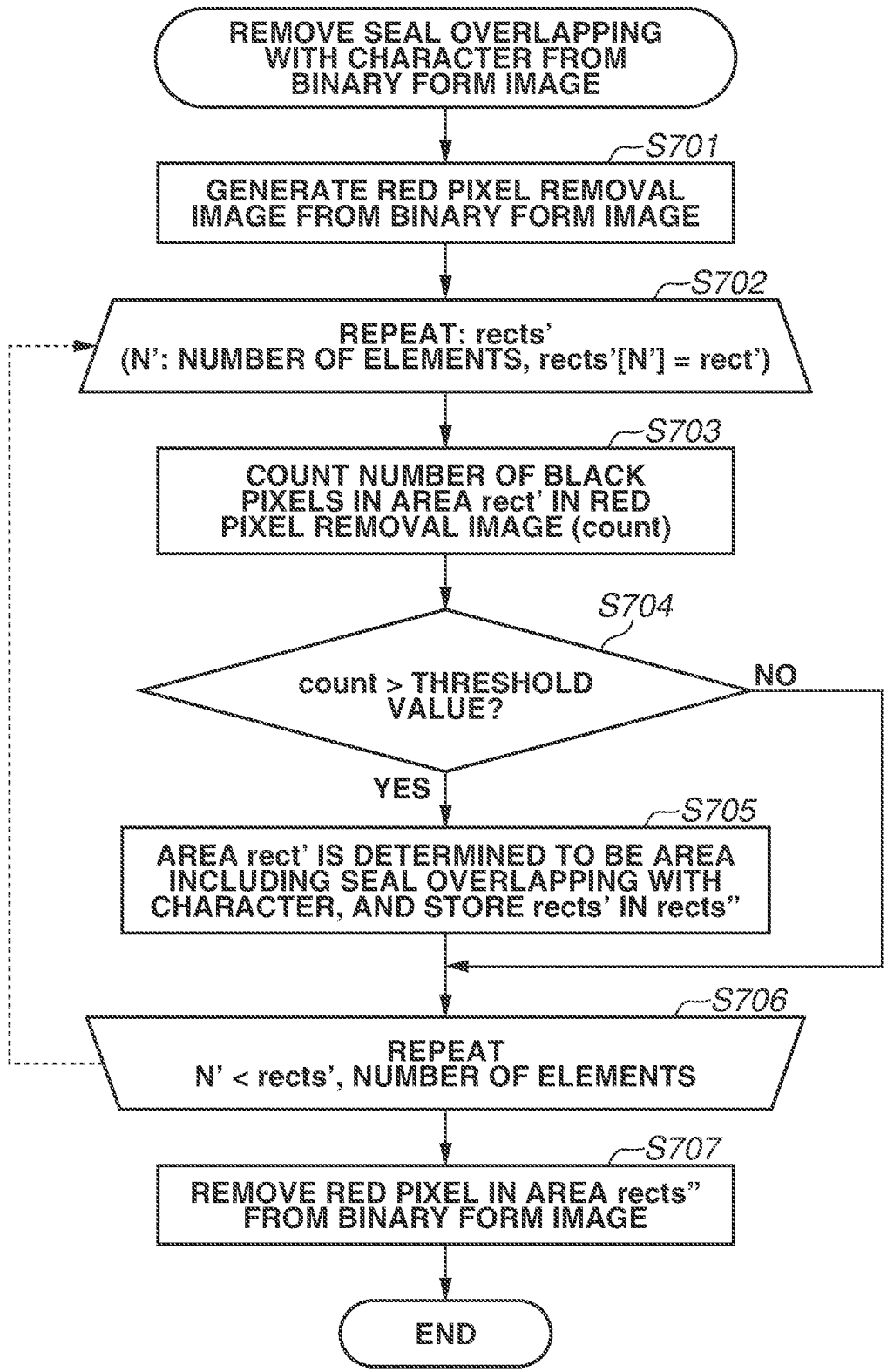
FIG. 7 is a flowchart illustrating processing of removing a seal overlapping a character from a binary image.

Next in step S206, the CPU 111 removes the seal overlapping a character from the binary form image 600. FIG. 7 is a flowchart illustrating processing for removing a seal overlapping a character from a binary image according to the present exemplary embodiment. In step S701, the CPU 111 generates a red pixel removal image 800 (refer to FIG. 8) which is obtained by removing pixels at the same positions as the black pixels in the red color extraction image 400 from the binary form image 600 (conversion into white pixels). The red pixel removal image 800 is equivalent to an image obtained through binarization processing in which the red pixels in the input image are converted into white pixels, and pixels having remaining colors (namely, the predetermined colors other than red and white on the background, for example, black, which is a character color) are converted into black pixels.

Next the CPU 111 performs the operations in steps S702 to S706 based on each rectangular information for which the CPU 111 determines that the conditions for the seal likeliness is satisfied (the rectangular information determined to be a candidate area of the seal) in step S204. Step S702 is a loop limit indicating a start of the loop processing, and step S706 is a loop limit indicating an end of the loop processing. The operations in steps S703 to S705 are repeatedly performed on pieces of the rectangular information selected in step S204 as the processing target in order.

In step S703, the CPU 111 counts the number of black pixels in an area (801 or 802) corresponding to the rectangular information as the processing target in the red pixel removal image 800.

Next, in step S704, the CPU 111 evaluates whether the counted number of black pixels is more than a threshold value. In a case where the number of black pixels in the rectangular area is more than the threshold value (YES in step S704), the CPU 111 determines that the area is an area including a seal overlapping a character, and the processing proceeds to step S705. In a case where the number of black pixels is the threshold value or less (NO in step S704), the CPU 111 that the area is not the area in which the seal overlaps the character, and the processing proceeds to step S706. In the example in FIG. 8, the area 801 includes the black pixels more than the threshold value, and thus is determined to be the area in which the seal overlaps the character. By contrast, the area 802 includes zero black pixel, and thus the area 802 is determined not to be the area including a seal overlapping a character. According to the present exemplary embodiment, the number of black pixels is used as a criteria for determining whether the area is the area including the seal overlapping the character. Alternatively, a size, a black pixel density, and an aspect ratio of the black pixel block may be used to determine whether a character exists in the area, for example. Yet alternatively, a method may be used in which whether or not a character-like black pixel block exists in the area is determined by performing the OCR in each rectangular area to digitize a certainty of a character and evaluating whether the digitized value exceeds a threshold value.

Next, in step S705, the CPU 111 stores the rectangular information determined to be the area including the seal overlapping the character (an overlapping area) in a different area (rects") in the RAM 113 so that the rectangular information can be discriminated from the others. The operation in step S705 is directed to discriminating the rectangular information determined to be the area including the seal overlapping the character from the other pieces of the rectangular information. Thus, the rectangular information may be discriminated by application of a predetermined label.

Next in step S706, the CPU 111 determines whether the condition for terminating the loop processing is satisfied (whether all pieces of the rectangular information selected as the seal candidates in step S204 are evaluated), and in a case where there is the rectangular information not yet evaluated, the operations in steps S703 to S705 are repeated with the next rectangular information set as the processing target. In a case where the evaluation is completed for all the pieces of the rectangular information selected as the seal candidates in step S204, the processing proceeds to step S707.

Next in step S707, the CPU 111 converts, into a whit pixel, a pixel that is included in the area determined, in step S705, to be an area including the seal overlapping the character (i.e., the area corresponding to the area information stored as "rects" in step S705) in the binary form image 600 and is located at a position corresponding to the black pixel (i.e., the red pixel in the form image 300) in the red color extraction image 400, thus generating a binary image with the seal removed (hereinafter, referred to as a seal-removed binary image 900) in FIG. 9. In an area 901 corresponding to the rectangle area 801 determined, in step S704, to be the area including the seal overlapping the character, pixels of the seal (the red pixels) are removed, and thus the characters are remained. By contrast, in an area 902 corresponding to the area 802 determined, in step S704, not to be the area including the seal overlapping the character, the red pixels are not removed. Thus, pixels corresponding to the red characters exist without being removed. As a method for generating the seal-removed binary image 900, procedures different from the above-described methods may be used as long as the same image can be generated. For example, the seal-removed binary image 900 may be generated by extracting, from the red pixel removal image 800, a partial image corresponding to the area 801 determined to be the area including the seal overlapping the character and overwriting the extracted partial image on an area 601 in the binary form image 600.

Next in step S207, the CPU 111 executes character area extraction processing (character segmentation processing for segmenting each character image) using the seal-removed binary image 900, executes OCR processing on each character image, and outputs a recognition result for each character image included in the seal-removed binary image 900. Any method may be used for algorithms of the area extraction processing and the OCR processing.

In the above-described exemplary embodiment, the color of the seal has been described as red, but is not limited to red. For example, in a case where a blue seal or the like is a processing target, a blue pixel may be a determination target instead of a red pixel. Further, a seal according to the present exemplary embodiment includes the imprint of various seals and stamps.

According to the first exemplary embodiment, pixels having a color in the same color group as that of the color of the seal (red pixels) are deleted from the area (conversion into white pixels) in the area that includes a predetermined number or more of pixels having a color in a color group different from that of the color of a seal (for example, black pixels) among the areas determined to be a seal candidate. By contrast, the pixels having a color in the same color group as that of the color of the seal (the red pixels) are not deleted in the area that is determined to be the seal candidate and does not include therein the predetermined number or more of pixels having a color in a color group different from that of the color of the seal (e.g., the black pixels). Accordingly, a character having a color in the same color group as that of the color of the seal can be prevented from being mistakenly recognized as the seal and removed.

Second Exemplary Embodiment

In a second exemplary embodiment, a difference from the first exemplary embodiment will be described, and configurations and procedures not particularly specified are similar to those according to the first exemplary embodiment. In the first exemplary embodiment, the processing is performed on the assumption that the color of a seal is red. According to the second exemplary embodiment, the color of a seal is specified by analyzing an input image, and processing is performed based on the specified color.

Figure 10:
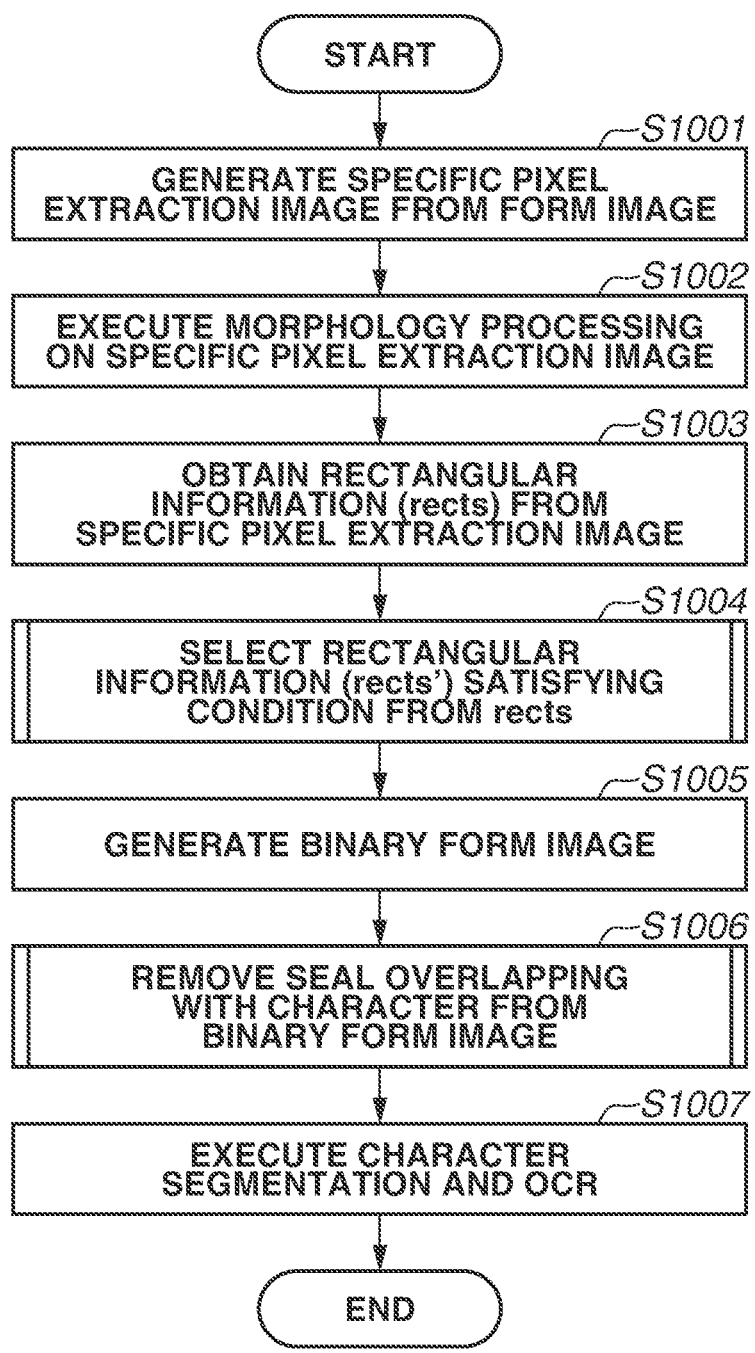
FIG. 10 is a flowchart illustrating image processing according to a second exemplary embodiment.
Figure 11:
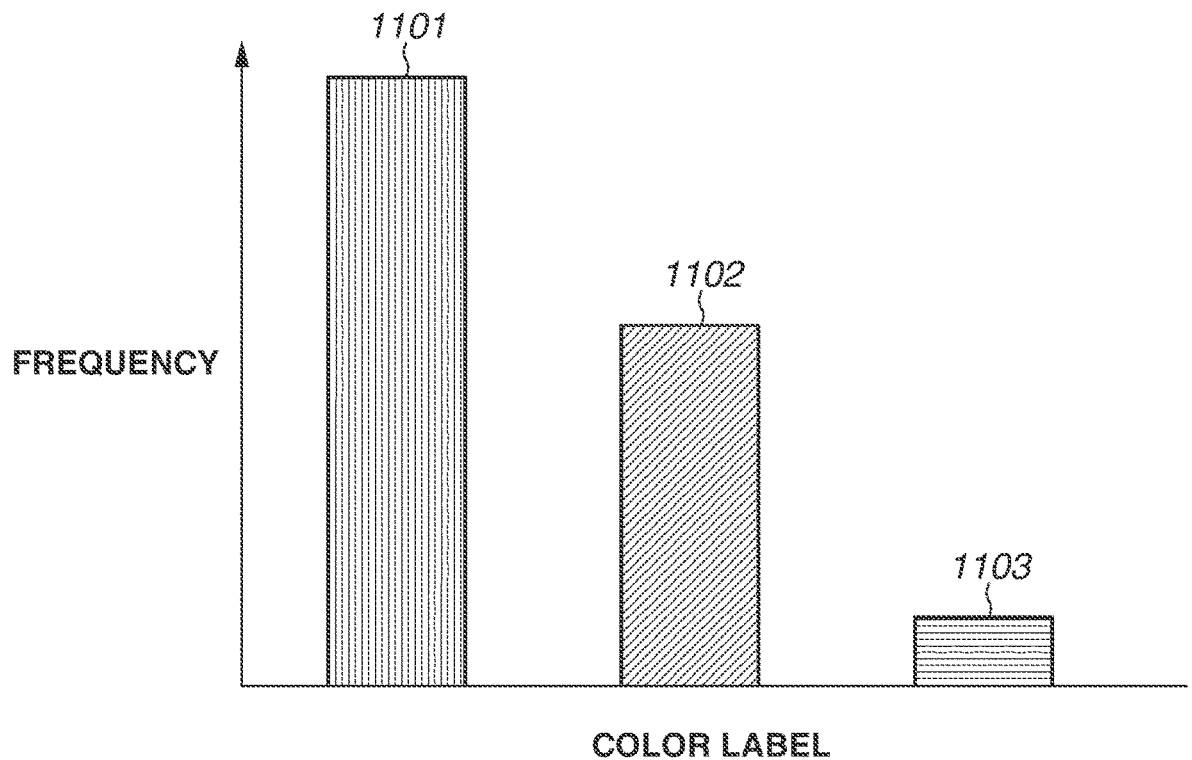
FIG. 11 illustrates a frequency distribution of an analysis result of an input image according to the second exemplary embodiment.

FIG. 10 is a flowchart illustrating processing according to the second exemplary embodiment. In step S1001, the CPU 111 first analyzes a color included in an input image. According to the present exemplary embodiment, the CPU 111 performs labeling processing of applying a label to each pixel included in the input image in such a manner that the same label is applied to the pixels determined to have the same color. The CPU 111 then counts, for each label, the number of the pixels to which the corresponding label is applied, and calculates a frequency distribution of each color included in the input image. FIG. 11 illustrates an aggregate result of an appearance frequency of each group of pixels determined to have the same color by analyzing color information of the input image. In a common business document, such as a form, a color having a highest frequency is a background color, so that a color corresponding to a label 1101 (e.g., white) is considered to be the background color in the example in FIG. 11. A color having a next highest frequency is a color often used in a text, so that the color corresponding to a label 1102 (e.g., black) is considered to be a character color of the text. A color having a lowest frequency is considered to be a color used in a seal and the like, and thus the color corresponding to a label 1103 is regarded as a specific color corresponding to the seal, in the second exemplary embodiment. Further, a binary image (a specific-pixel-extraction image) is generated in which a pixel applied a specific color label is expressed as a black pixel, and the other pixels are expressed as white pixels.

In the example of the analysis result in FIG. 11, the specific color label is the label 1103. In a case where the input image includes a plurality of seals having different colors, a plurality of color labels appears as a result of the labeling processing. The appearance frequency of each of the plurality of color labels is lower than those of the background color and a major color of the text. In such a case, the color labels having the low appearance frequencies are all regarded as the specific colors, and a binary image (specific-pixel-extraction image) is generated in which pixels applied the specific color labels are expressed as black pixels and the other pixels are expressed as white pixels.

Next in step S1002, the CPU 111 executes morphology processing on the specific-pixel-extraction image, and performs processing of connecting black pixels existing near one another in the specific-pixel-extraction image, thus generating an area determination image. In step S1003, the CPU 111 obtains rectangular information about a rectangular circumscribing each black pixel block from the area determination image and stores the rectangular information in the RAM 113, as in the operation in step S203 of the first exemplary embodiment.

Next in step S1004, the CPU 111 evaluates a seal likeliness for the rectangular information obtained in step S1003 and selects the rectangular information determined to be the seal candidate. In the selection operation in step S1004, an operation similar to that in step S204 according to the first exemplary embodiment is executed, and thus, the rectangular information can be selected as the seal candidate. In steps S1005 to S1007, operations similar to those in steps S205 to S207 in the first exemplary embodiment are executed, and thus, processing of removing the specific color of the seal is performed in an area determined to be an area including a seal overlapping a character.

According to the present exemplary embodiment, if a color other than red is used as the color of a seal, the color of the seal can be automatically specified and removed through an analysis of an input image.

Third Exemplary Embodiment

In a third exemplary embodiment, a difference from the first exemplary embodiment will be described, and configurations and procedures not particularly specified are similar to those in the first exemplary embodiment.

According to the first exemplary embodiment, in a case where it is determined that the number of black pixels counted in step S703 is the threshold value or less in step S704 in FIG. 7, the CPU 111 advances the processing to step S706. In the third exemplary embodiment, in a case where it is determined that the number of black pixels counted in step S703 is the threshold value or less in step S704 in FIG. 7, pixels corresponding to the counted black pixels are removed (converted into white pixels) in the seal-removed binary image 900 generated in step S707.

According to the present exemplary embodiment, a noise can be removed from a character area having a color in the same color group as that of the color of a seal, so that an OCR accuracy can be improved with respect to not only a character overlapping the seal but also a character having the color in the same color group as that of the color of the seal.

Fourth Exemplary Embodiment

In a fourth exemplary embodiment, a difference from the first exemplary embodiment will be described, and configurations and procedures not particularly specified are similar to those according to the first exemplary embodiment.

According to the fourth exemplary embodiment, in a case where an area is determined, in step S704, to be an area including the seal overlapping the character, the CPU 111 obtains circumscribed rectangle information about the black pixel block of the area counted in step S703.

In step S707 according to the first exemplary embodiment, the pixel that is included in the area including the seal overlapping the character and is located at a position corresponding to the red pixel is converted into a white pixel in the binary form image 600. According to the fourth exemplary embodiment, the pixel that is included in an area which is several pixels larger than the circumscribed rectangle for the black pixel block obtained in step S703 and is located at a position corresponding to the red pixel is converted into a white pixel in the binary form image 600. In other words, a red pixel having color group similar to that of the seal is removed from a periphery of a position at which a character pixel exists in the area in which the seal overlaps the character.

According to the fourth exemplary embodiment, a red pixel is removed from a periphery of a black character of a text in a seal candidate area, so that if a red character having a color group similar to that of a seal is included in the seal candidate area, the red character is remained without being removed.

Fifth Exemplary Embodiment

According to the first exemplary embodiment, the information processing apparatus 110 executes the processing described in each flowchart illustrated in FIG. 2 and others. However, the aspect of the embodiments is not limited to the above-described configuration, and the processing may be performed by another apparatus. For example, the image processing method in each flowchart described above may be executed in the MFP 100 including the scanner 101 or may be executed by a server or a cloud connected via the network.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-232162, filed Dec. 23, 2019, which is hereby incorporated by reference herein in its entirety.

What is claimed is:
1. An apparatus comprising:
at least one memory that stores a set of instructions; and
at least one processor that executes the instructions to perform:
receiving an input image;
determining one or more candidate areas in the input image based on first pixels having a specific color included in an input image;

determining a target area from among the one or more candidate areas, wherein the determined target area is a candidate area in which a number of second pixels is greater than a threshold value, and wherein the second pixel has a predetermined color that is different from the specific color; and generating a processed image by converting a pixel that corresponds to one of the first pixels in the target area into a white pixel.

2. The apparatus according to claim 1,
wherein the at least one processor further performs generating, from the input image, a binary image, and
wherein the one or more candidate areas are determined based on the first binary image, and
wherein the processed image is a second binary image.

3. The apparatus according to claim 1, wherein the one or more candidate areas are determined based on a binary image obtained after morphology processing is performed on a first binary image generated based on the first pixels included in the input image.

4. The apparatus according to claim 1, wherein each of the one or more candidate areas is an area satisfying a predetermined condition in areas determined based on a binary image obtained after morphology processing is performed on a third binary image generated based on the first pixels having the specific color included in the input image.

5. The apparatus according to claim 4, wherein the predetermined condition is a condition for evaluating a seal likeliness.

6. The apparatus according to claim 4, wherein the predetermined condition includes at least either one of a size of an area and a pixel density of black pixels in the area.

7. The apparatus according to claim 1, wherein the specific color is a color of a seal or a stamp.

8. The apparatus according to claim 1, wherein the specific color is red and the predetermined color is black.

9. The apparatus according to claim 1, wherein the specific color is a color specified by analyzing the input image.

10. The apparatus according to claim 1, wherein the specific color is a color specified based on a frequency distribution calculated based on a pixel applied with a label which is applied to each pixel having a same color in the input image.

11. The apparatus according to claim 1, wherein the second pixels having the predetermined color correspond pixels having a character color in a text.

12. The apparatus according to claim 2,
wherein the first binary image is generated, from the input image, by converting the first pixel having the specific color into black pixel and by converting other pixels than the first pixels into white pixels,
wherein the at least one processor further performs:
generating, from the input image, a third binary image by converting a pixel having brightness darker than a predetermined brightness into black and by converting a pixel having brightness lighter than the predetermined brightness into white;
generating, from the third binary image, a fourth binary image by converting, into a white pixel, a black pixel of the third binary image, the black pixel in the third binary image corresponding to the first pixel having the specific color in the input image,
wherein the number of second pixels having the predetermined color in the candidate area is counted by counting a number of black pixels in the candidate area in the fourth binary image.

13. The apparatus according to claim 12, wherein, in a case where the counted number of black pixels in the candidate area is greater than the threshold value, the candidate area is determined to be the target area as the processing target and a black pixels corresponding to the first pixels in the target area of the fourth binary image is converted into white pixels.

14. The apparatus according to claim 13, wherein, in a case where the counted number of the black pixels in the candidate area is equal to the threshold value or less, processing of converting the black pixels into white pixels is performed.

15. The apparatus according to claim 2, wherein the second binary image is generated by converting, into a white pixel, a pixel corresponding to the pixel having the specific color in a periphery of a position at which the pixel having the predetermined color in the target area exists in the first binary image.

16. The apparatus according to claim 1, wherein the at least one processor further performs character recognition processing on the processed image.

17. A non-transitory computer readable storage medium storing a program for causing a processor to perform:
receiving an input image;
determining one or more candidate areas in the input image based on first pixels having a specific color included in an input image;
determining a target area from among the one or more candidate areas, wherein the determined target area is a candidate area in which a number of second pixels is greater than a threshold value, and wherein the second pixels has a predetermined color that is different from the specific color; and
generating a processed image by converting a pixel that corresponds to one of the first pixels in the target area, into a white pixel.

18. The storage medium according to claim 17, wherein the at least one processor further performs character recognition processing on the processed image.

19. A method for processing an image comprising:
receiving an input image;
determining one or more candidate areas in the input image based on first pixels having a specific color included in an input image;
determining a target area from among the one or more candidate areas, wherein the determined target area is a candidate area in which a number of a second pixels is greater than a threshold value, and wherein the second pixel has a predetermined color that is different from the specific color; and
generating a processed image by converting, a pixel that corresponds to one of the first pixels in the target area into a white pixel.

20. The method according to claim 19, further comprising performing character recognition processing on the second binary processed image.

21. The apparatus according to claim 1, wherein a pixel having the specific color in the candidate area which is not the target area is not converted into a white pixel.

22. The apparatus according to claim 1,
wherein the candidate area is an area determined to be an area including a candidate image of a seal,
wherein the target area is an area determined to be an area including the candidate image of a seal that overlaps a candidate character, and wherein the candidate area which is not the target area is an area determined to be an area including the candidate image of the seal that does not overlap a candidate character.

* * * * *